United States Patent [19]

Rotier

[11] Patent Number: 4,859,030
[45] Date of Patent: Aug. 22, 1989

[54] HELMET MOUNTED DISPLAY WITH IMPROVED BRIGHTNESS

[75] Inventor: Donald J. Rotier, St. Paul, Minn.

[73] Assignee: Honeywell, Inc., Minneapolis, Minn.

[21] Appl. No.: 78,947

[22] Filed: Jul. 29, 1987

[51] Int. Cl.⁴ .............................................. G02B 27/14
[52] U.S. Cl. ..................................... 350/174; 350/3.7; 350/3.72; 350/172
[58] Field of Search ....................... 350/3.72, 172, 174, 350/3.7, 164, 166, 547, 171

[56] References Cited

U.S. PATENT DOCUMENTS

| | | | |
|---|---|---|---|
| 4,099,841 | 7/1978 | Ellis | 350/174 |
| 4,261,647 | 4/1981 | Ellis | 350/174 |
| 4,407,564 | 10/1983 | Ellis | 350/174 |
| 4,600,271 | 7/1986 | Boyer et al. | 350/3.72 |
| 4,688,879 | 8/1987 | Fairchild | 350/174 |

OTHER PUBLICATIONS

"Thin Film Optical Filter", 2nd Edition, by H. A. MacLeod and published by McMillan Publishing Co., (Chpts. 8 and 5).

Primary Examiner—Bruce Y. Arnold
Assistant Examiner—Martin Lerner
Attorney, Agent, or Firm—Charles J. Ungemach

[57] ABSTRACT

A helmet mounted display in which a filter receives rays of light at various angles of incidence from an image to be superimposed on the scene being viewed by the operator and reflects these rays to a second surface where the rays are re-reflected through the filter and to the eye of the observer characterized in that the filter is coated in such a manner that it reflects from each position on its surface rays from the image that strike at predetermined angles of incidence but which transmits at each position rays which are received from the second surface.

14 Claims, 4 Drawing Sheets

HELMET MOUNTED DISPLAY WITH IMPROVED BRIGHTNESS

BACKGROUND OF THE INVENTION

1. Field of the Invention

This invention relates to a display which has special utility in connection with an attachment for a helmet worn by an aircraft pilot (helmet mounted display) wherein an image of a desired display, such as information on the face of a cathode ray tube, can be introduced into the field of view being observed by the pilot so that the desired display is superimposed on the scene being viewed in the pilot's vision.

2. Description of the Prior Art.

Helmet mounted displays are well known in the prior art and usually employ an optical system which receives an image of a desired display from a cathode ray tube and projects a collimated image onto a partially reflecting surface where it is reflected back to the pilot's eye so that the image is focused at infinity and combined with the scene being viewed by the pilot through his windshield. The apparatus is mounted onto the helmet worn by the pilot and the reflecting surface is located relatively close to one of the pilot's eyes so that the size of the optical components may be kept small. One way of accomplishing this is to employ a "folded catiodoptric" system which uses a spherical reflector that is highly reflective to the wave lengths used for the desired display and a planar or slightly curved beam splitter set at an angle to the spherical surface and which is 50 percent reflective and 50 percent transmissive. The rays from the optical system then pass to the planar beam splitter, are 50 percent reflected to the spherical surface, reflected back to the beam splitter and then 50 percent transmitted to the pilot's eye. While this concept allows the optical system to be inserted close to the pilot's eye, it does provide a problem with respect to the brightness of the desired display. Since the rays must be both reflected and transmitted through the beam splitter, a minimum loss of a factor of 4 is suffered by the display (50 percent×50 percent).

In recent years, the art of producing filters has advanced to a state where a filter or beam splitter may be produced which has very selective characteristics, both with respect to the wavelength of light incident upon the filter, but also with respect to the angle of incidence of the light upon the surface of the filter. More particularly, it is possible to create a filter which is tuned in such a way as to transmit only a fairly narrow wavelength of light (for example, the 540 nm to 550 nm green spike emitted by a P43 phosphor on the CRT) and also to be highly reflective when the angle of incidence of this narrow band is within a chosen band of angles while being highly transmissive to the same green light when the angles of incidence are outside the chosen range. For example, U.S. Pat. No. 4,261,647 shows an optical system referred to as a "head-up display" which has a planar and spherical surface receiving light from a CRT. The planar surface is coated so as to be reflective to a narrow band of wavelengths coming from the CRT when the rays strike the surface within a narrow conical ray bundle but which is transmissive to the CRT wavelength when the rays are outside such conical bundle. Because of the optics of the head-up display system do not need to be close to the pilot's eye, the rays from the cathode ray tube all strike the planar surface at approximately the same angle and are within the small conical bundle which become reflected to the spherical member where they are again reflected and passed back through the planar filter but now at an angle which is outside the conical bundle necessary for reflection and thus are now transmitted to the observer. Such an arrangement cannot find applicability in a helmet mounted sight since the optics are much smaller and need to be close to the pilot's eye and the rays striking the surfaces do so at a wide variety of angles. Accordingly, within the size limitations of the optical system, it is not practically possible to arrange to have the rays emerge from the optical system to the planar reflector, all at substantially the same angle and, accordingly, a filter like that of the head up display would not operate satisfactorily in a helmet mounted system.

SUMMARY OF THE INVENTION

The present invention overcomes the problems found in the prior art by providing a filter which is not only selective to a predetermined wavelength but is highly reflective to rays that need to be reflected while highly transmissive to rays that need to be transmitted even though the incidence angles may be quite varied over the surface of the filter. This is accomplished by coating the filter with multiple coatings and varying the depth of the film in a predetermined manner over the surface of the filter. This causes the characteristics of the filter to change from one position to another over the surface thereof so that at one position rays having an angle of incidence in a first chosen range will be predominantly reflected and not transmitted, but at another position along the filter rays having an angle of incidence in an entirely different chosen range will be predominantly reflected. By knowing the optical paths of the system, the whole surface of the filter may be characterized so as to be highly reflective to all of the incoming ray regardless of their incidence angle. Any rays falling outside the chosen angles of incidence at any of the positions will be transmitted and not reflected. The positions of the filter and spherical member with respect to the optical system are adjusted so that the angle of incidence of the rays from the optical system to the filter at any position is not the same as the angle of incidence of rays reflected from the spherical member to the filter at that position. Then the filter is characterized so that the incoming rays from the optical system striking the filter at the predetermined incidence angles are predominantly reflected to the spherical member while those which are reflected from the spherical member to the filter fall outside the predetermined incident angles and are therefore predominantly transmitted to the eye of the operator.

In other words, after choosing the arrangement of components, so that the angle of incidence for the rays to be reflected will be different than the angle of incidence for the rays to be transmitted at each position, then for each location along the filter, a set of parameters is established which will accomplish the desired high reflectivity and transmissivity for each position.

A more complete understanding of the invention will be obtained upon an examination of the following specification and claims read in connection with the attached drawings.

DETAILED DESCRIPTION OF THE PREFERRED EMBODIMENT

Figure 1:
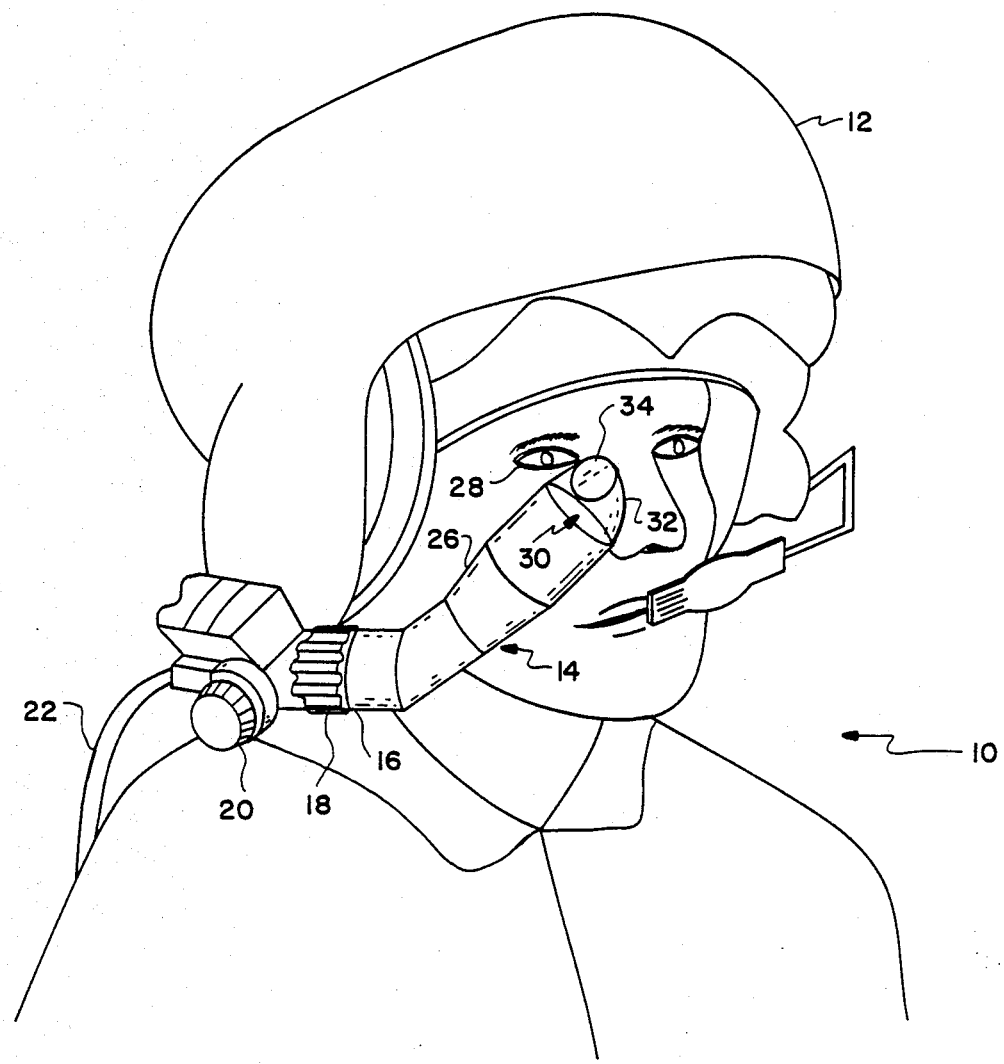
FIG. 1 shows a pilot wearing a helmet mounted display device.

In FIG. 1 an operator such as an aircraft pilot 10 is shown wearing a helmet 12 upon which is mounted a display unit generally identified by reference numeral 14. The display unit consists of a small cathode ray tube section 16 having controls 18 and 20 thereon with an electrical cable 22 for supplying the power and the video signals. Display 14 also includes an optical transmitter section 26 for conveying rays of light from the cathode ray tube towards the eye 28 of the observer. The optic section 16 ends in a tuned reflection/transmission section 30 comprising a spherical tuned optical member 32 and a tuned filter member 34. It should be understood that while the filter member 34 is shown herein to be substantially planar, in some cases it may be desirable for it to have some curvature and while member 32 is described herein as spherical, there may be instances where different curvatures may be useful. The spherical member 32 is coated so as to be reflective to a narrow band of wavelengths emitted by the cathode ray tube section 16 which, in the preferred embodiment, may be the green spike between 540 nm and 550 nm from a P43 or P53 phosphor. All other wavelengths are predominantly transmitted by spherical member 32. The filter member 34 is tuned in such a way that its transmission characteristics with respect to the green spike between 540 nm and 550 nm vary across the surface thereof for purposes to be explained hereinafter. Other wavelengths are freely transmitted by filter 34.

In operation, while viewing a scene through the windshield with both eyes, the pilot sees substantially all wavelengths of light from the scene except that the right eye 28 may not see wavelengths between 540 nm and 550 nm from the remote scene. However, these wavelengths being transmitted from the CRT 16 pass through the optical section 26 and are first reflected from the filter 34 to the spherical member 32 and then back through the filter 34 to eye 28. In this manner the information on the CRT 16 is transmitted to the one eye 28 of the pilot so as to be superimposed on the rest of the scene he views. The optics of the system, as is well known in the art, are such that the image he views is at infinity so that both this image and the scene being viewed are in the same focus for the pilot.

Figure 2:
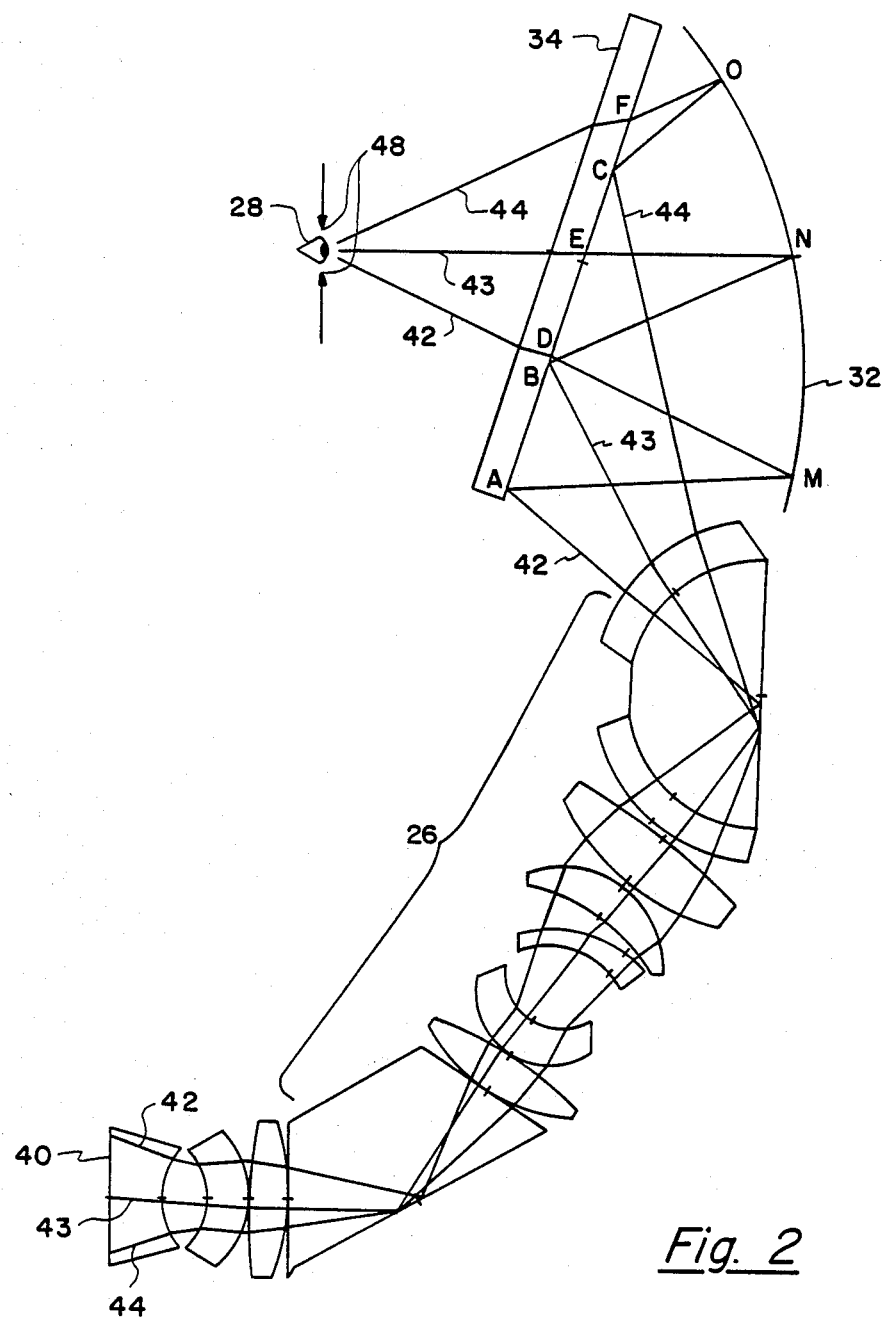
FIG. 2 shows the basic optical system of the present invention.

FIG. 2 shows the optical arrangement of the helmet mounted display 14, in more detail. In FIG. 2 the surface of the CRT upon which the information is displayed is shown by reference numeral 40 and, 3 rays from this surface identified by reference numerals 42, 43, and 44 are shown emanating from the surface through the optical system 26 and emerging therefrom so as to strike the filter 34 at points A, B, and C, respectively. It is seen that ray 42 strikes filter 34 at a relatively small incidence angle whereas ray 43 strikes surface 34 at a somewhat greater incidence angle and ray 44 strikes filter 34 at a fairly large incidence angle. Filter 34 is tuned at the area A to be highly reflective (over 85 percent) to rays having the incidence angle of ray 42 and accordingly most of the energy is reflected from filter 34 to the spherical member 32 where it strikes at point M thereon. Similarly, filter 34 is tuned at the area B to be highly reflective to rays having a incidence angle of ray 43 and accordingly most of the energy is reflected from area B to the spherical member 32 at point N. Likewise, filter 34 is tuned at area C to be highly reflective to rays having a incidence angle of ray 44 and thus most of the energy is reflected from point C to point O on spherical member 32. Thus, as will be described in more detail in connection with FIG. 3, most of the energy leaving the optical system 26 in the green wavelength will be reflected off of filter 34 to spherical member 32.

As mentioned, spherical member 32 is tuned throughout its surface to be highly reflective to the green wavelength, but highly transmissive to all other wavelengths. Accordingly, the green wavelength being reflected along rays 42, 43, and 44 will be highly reflected back towards filter 34 where they will now strike at points D, E, and F, respectively. It should be noted that the angles of incidence of these rays are now such that at point F the incident angle is fairly large, at point E the incident angle is fairly small, and at point D the angle of incidence is quite small and lies on the opposite side of the perpendicular to the surface of the filter.

Points D, E and F also may receive rays of light from the optical system 26 and points A, B and C may receive rays of light reflected from spherical member 32, but these rays have not been shown in the FIGURES for simplicity. Nevertheless, in the arrangement of FIG. 2, the rays from spherical member 32 make different incidence angles at the various positions on the filter 34 than the rays from optical system 36 make at those positions. This is best seen at points B and D which are quite close together. Ray 43 makes an incidence angle at point B of about 42 degrees while ray 42 makes an incidence angle at point D of about 6 degrees. The same will be true at all other positions on filter 34 although not necessarily by the same amount as will be discussed in connection with FIGS. 3 and 4. The characterization of filter 34 is therefore operable to reflect a large portion (over 85 percent) of incoming rays 42, 43 and 44 and to transmit a large portion (again over 85 percent) of the energy reflected from spherical member 32 since the incidence angles of the latter fall outside the range of the incidence angles for reflection of the incoming rays such as rays 42, 43 and 44. As a result, a much brighter image ($0.85 \times 0.85 = 0.7225$) will reach the observers eye 28 which is shown at the exit pupil location 48 of the system (defined in FIG. 2 by a pair of arrows). More particularly, the eye is shown slightly in front of the point where rays 42, 43, and 44 meet because of the rotation of the eye as it looks in different directions. In actual practice the rays 42, 43, and 44 are merely central rays in a plurality of parallel rays which emerge from the system and pass through the exit pupil of the display at location 48. In other words, each of the rays 42, 43, and 44, as well as all of the angles therebetween, comprise a bundle of parallel rays which reach the eye in collimated fashion. Thus, the image the eye sees is at infinity as is the scene he views through the windshield of the aircraft. Accordingly, the observer will see the scene he is viewing with a much brighter image of the CRT in the green wavelength superimposed thereon.

Figure 3:
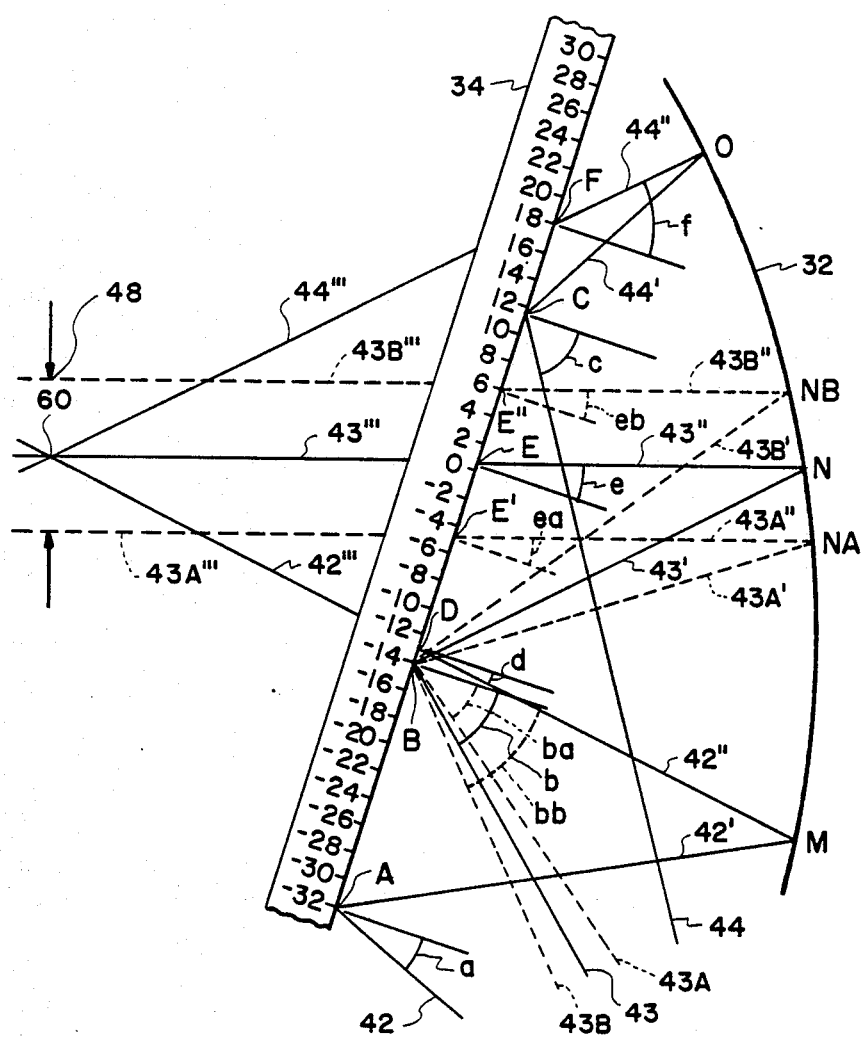
FIG. 3 shows a detailed ray diagram for the angle sensitive reflective elements of the present invention.
Figure 4:
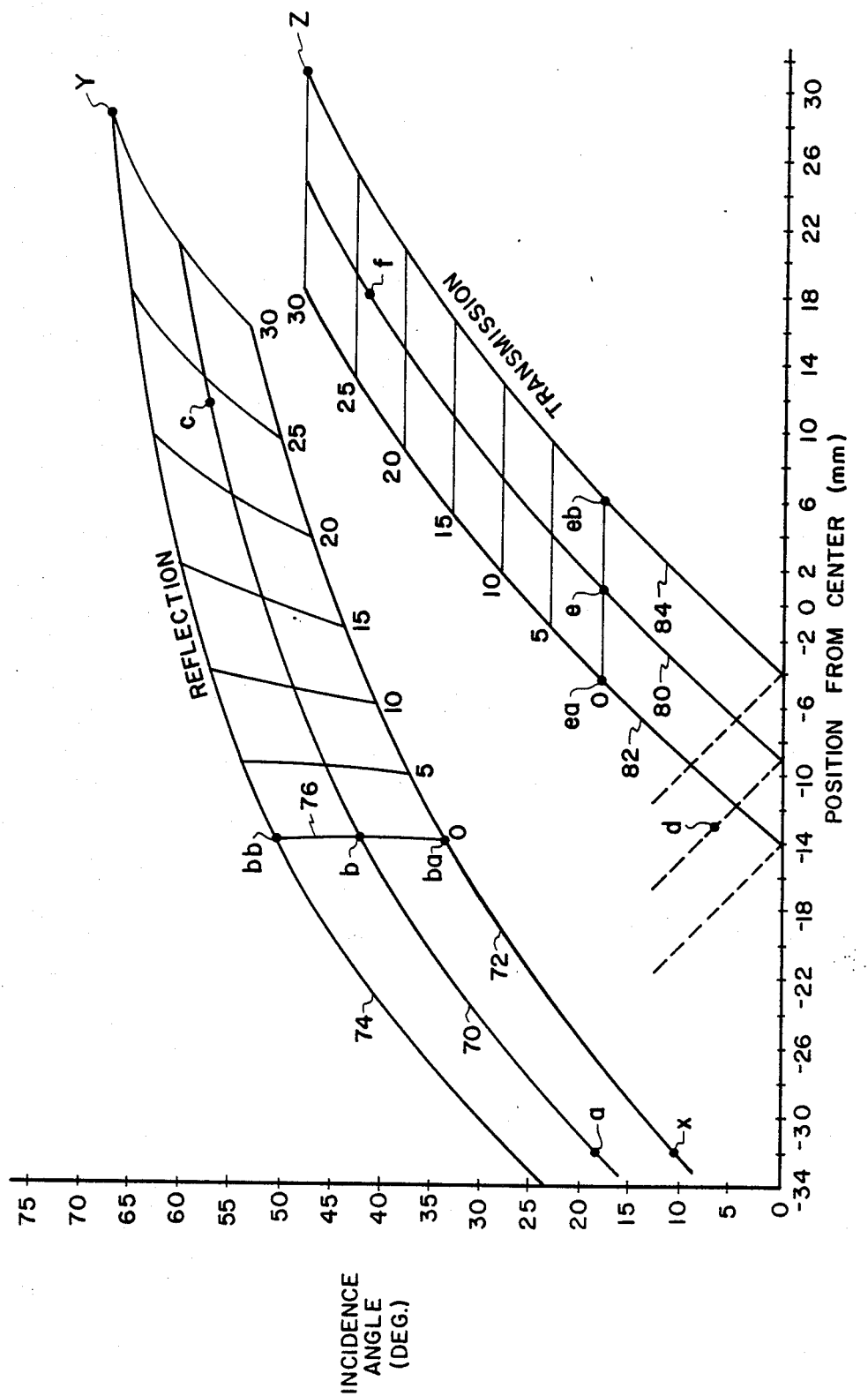
FIG. 4 is a graph showing the variation of angle of incidence of light striking the filter with respect to the position from the center of the filter for both reflection and transmission.

Attention is now directed to FIGS. 3 and 4 for a more detailed description of the characterization of filter 34.

In FIG. 3, filter 34 is shown with indicia markings thereon ranging in a plus and minus direction from the central portion 0 for purposes of explanation. In the preferred embodiment, these indicia are approximately the number of millimeters which separate each indicia from the 0 position. Ray 43''', which is ray 43 after it emerges from the filter 34 and which is the horizontal ray passing through point 60 where the rays meet at the pilot's eye, defines the optic axis and forms the basis for the "0" position. Because the filter 34 is tilted, the position of the "0" indicia on the right side of filter 34 is below the optic axis represented by ray 43 by a small amount. In any event, it is seen that in a downwards direction from the "0" position the indicia are considered negative and range from "0" to "−32 millimeters" and in a positive direction from the "0" to a positive "30 millimeters".

FIG. 3 also shows the spherical member 32 and the rays 42, 43, and 44 emerging from the optical system not shown in FIG. 3. It is seen that ray 42 strikes the filter 34 at point A which is located approximately at −32 millimeters below the 0 point. The angle of incidence made by ray 42 to filter 34 at point A is shown in FIG. 3 as angle a. Accordingly, this ray will be reflected along a path 42' to the spherical member 32 at point M where it is again reflected along a path 42'' to point D on filter 34. It is seen that the angle of incidence that is made between ray 42'' on filter 34 on point D is given by angle d. In this case, the perpendicular at point D is above the ray 42'' which is not be the case in connection with other reflected rays to be described hereinafter. Ray 42'' is transmitted by filter 34 along a line 42''', and intersects the optic axis 43'''' at the point 60 in the center of the aperture formed by member 48. As explained, the operator's eye will be slightly in front of point 60 and point 60 actually lies in the center of rotation of the eye so that the eye is always viewing directly along one of the rays being transmitted by filter 34.

In like manner, ray 43 is shown to strike the surface of filter 34 at point B which is approximately 14 millimeters below the 0 point. The angle of incidence made by ray 43 at point B is shown as angle b. Ray 43 is reflected to the spherical member 32 along a line 43' to point N where it is reflected along a line 43'' to point E which is seen to be just above the "0" reference point on filter 34. The angle of incidence of ray 43'' at point E is given by angle e. Ray 43'' emerges from filter 34 along line 43''', the optic axis, to point 60.

Ray 44 is shown striking filter 34 at a point C which is a little below a +12 millimeters thereon and the angle of incidence at point C is given by angle c. Ray 44 is reflected along a line 44' to spherical member 32 at point 0. This ray is again reflected along line 44'' to point F on filter 34 which is seen to be at about a +18 millimeters upwards from the 0 reference point. The angle of incidence at point F is given by angle f. Filter 34 transmits ray 44'' along a line 44''' which also intersects the optic axis 43'''' at point 60.

As mentioned above, each of the rays 42''', 43''', and 44''' actually comprise a bundle of parallel rays all passing through the aperture formed by member 48. Two of these rays, parallel to ray 43''', are shown in FIG. 3 by dash lines 43A''' and 43B''', respectively. It is seen that 43A''' and 43B''' are the outside two rays parallel to 43''' which just miss the lower and upper edges of the aperture which constitutes the exit pupil location 48. Tracing these rays backward from the aperture, the dotted lines 43A'' and 43B'' represent the rays as they would be reflected from points NA and NB on spherical member 32. Ray 43A'' makes an incident angle ea at point E' on filter 34 which is seen to be at approximately −6 millimeters below 0 on filter 34. Ray 43B'' is seen to make an incidence angle eb at point E'' which is approximately +5 millimeters above 0 on filter 34.

Again tracing these rays backwards from point NA and NB, rays identified by reference numerals 43A' and 43B' are seen to converge back to near point B on filter 34. Ray 43A' makes an incident angle ba at point B and ray 43B' makes an incident angle bb at point B.

Again tracing these rays backwards, it is seen that two rays shown by dashed lines 43A and 43B are loose rays emerging from the optical system (not shown in FIG. 3) which, when taken through the reflections from filter 34 and spherical member 32, would produce the two parallel rays 43A''' and 43B'''. Since the angle of incidence for these three rays varies from a value ba to a larger value bb, the reflectivity at point B on filter 34 should be adjusted so that the best reflectivity can occur between these two angle extremes. As will be explained in connection with FIG. 4, angle ba is approximately 33 degrees, angle b is approximately 38 degrees, and angle bb is approximately 51 degrees. Accordingly, the reflectivity of point B on filter 34 should be adjusted so that all three rays will be included in the range of reflectivity for that point. More specifically, point B should be characterized to reflect rays whose incidence angles are between 33 degrees and 51 degrees with rays outside this range being transmitted. The same kinds of analysis is performed for each bundle of parallel rays that pass through the aperture formed by member 48 at various angles.

Filter 34 will therefore have to coated in such a way that the reflectivity at various points therealong changes in accordance with the angle of incidence expected from the optical system. It is known that the reflectivity of an optical member can be characterized over its surface by depositing optical coatings of various thicknesses over the surface. Such a procedure is described in a book entitled "Thin Film Optical Filter", 2nd edition, by H. A. MacLeod and published by Mc-Millan Publishing Co. (see, particularly, chapters 8 and 5).

The above-mentioned U.S. Pat. No. 4,261,647, characterizes the entire surface of optical members therein to reflect rays in one narrow conical angle and transmit rays outside of that conical angle but does not vary the conical angle at different positions on the surface. This characterization is performed by holographic means which could also be employed in the present invention although it would suffer the disadvantage of requiring that the characterized film be sealed between two pieces of glass. Varying the thickness of the film at various places along the filter can be accomplished on a single surface in the present invention without the necessity of sealing that film. By properly characterizing the film thickness along the filter 34, it has been shown possible to obtain approximately 85 percent reflectivity and approximately 85 percent transmissivity for the narrow band green wavelength utilized compared with the prior art of 50 percent for each. Thus, it is seen that by characterizing the filter as described herein, a significant increase in brightness is accomplished.

In FIG. 4, the variation of angle of incidence of the incoming rays compared with the position of incidence from the center of filter 34 is analyzed. In FIG. 4, curve 70 represents the various central rays that emerge from the optic system such as rays 42, 43 and 44 of FIG. 3, to be reflected by filter 34 to spherical member 32. Curve 72 and 74 represent those rays coming from the optic system which produce the extreme parallel rays that pass through the aperture formed by member 48 such as rays 43A''' and 43B''' of FIG. 3. These set of curves are labelled "REFLECTION". It is seen in FIG. 4 that to obtain the desired characteristic of reflection at a point −32 millimeters from center, the filter should be tuned to have maximum response for an incident angle of approximately 18 degrees. This is indicated in FIG. 4 as point a on the central line 70. Since point A of FIG. 3 is at −32 millimeters on filter 34, this shows that the incident angle a of FIG. 3 has a value of about 18 degrees. Similarly, at a point −14 millimeters from the 0 position, the characterization of filter 34 should be maximized for angles of incidence that are approximately 38 degrees as indicated as point b along line 70 and which corresponds to incident angle b of FIG. 3.

Likewise, for a position +10½ millimeters from the 0 position, the reflectivity of the filter 34 should be maximized for an incidence angle of about 57½ degrees as indicated as point c on line 70 which corresponds to the angle c of FIG. 3. Similarly, at −14 millimeters from the center position on filter 34 which, as explained in connection with FIG. 3, is the point where rays 43, 43a, and 43b, emerging from the optical system, strike the filter 34 so as to eventually produce the parallel rays 43''', 43a''', and 43b''' point B should be characterized so as to be maximum reflection for angles of incident between approximately 37 degrees, as represented by point ba on curve 72, and approximately 51 degrees as represented by point bb on curve 74. All of the rays emerging from the optical system to strike point B of FIG. 3 will be represented by points along a line from point ba through point b to point bb in FIG. 4 and this is shown by a line 76. Lines similar to line 76 are drawn to represent the family of rays which emerge from filter 34 and pass through the aperture of member 48 at other angles such as those shown in FIG. 4 at 5 degrees, 10 degrees, 15 degrees, 20 degrees, 25 degrees, and 30 degrees, respectively. Accordingly, by utilizing the REFLECTION curve from FIG. 4, the creation of a characterized filter 34 can be accomplished because at each point the range of permissible incidence angles is known an the thickness of the coatings at that point can be adjusted accordingly.

FIG. 4 also shows a group of curves 80, 82, and 84 labelled TRANSMISSION which represent the rays reflected from spherical member 32 and strike filter 34 for transmission therethrough to the aperture at point 60. At +18 millimeters from the center position, a point f on curve 80 indicates that a central ray striking point F in FIG. 3 has an incidence angle of approximately 43 degrees which corresponds to the incident angle f of FIG. 3. Similarly, at approximately +1 millimeter from the 0 position, the central ray should have an incidence angle of approximately 18 degrees as is indicated in FIG. 4 by point e, representing the angle e of FIG. 3. Likewise, at a −13 millimeters from the 0 point, the incidence angle should be approximately 6 degrees as is shown by point d representing the angle d in FIG. 3. It is noticed in FIG. 4 that point d is on a dotted line extension of curve 80 and this is because angle d in FIG. 3 is measured downwardly from the perpendicular to ray 42' whereas the incidence angles e and f are measured upwardly from the perpendicular to rays 43'' and 44'', respectively.

The three parallel rays 43''', 43a''', and 43b''' result from transmission lines 43'', 43a'', and 43b' which strike filter 34 at points E, E', and E'' From FIG. 4 it is seen that at a +6 millimeters from the 0 point, as represented by point eb on curve 84, the incidence angle is also approximately 18 degrees and that at −4.5 millimeters from point 0, as represented by point ea on curve 82, the incidence angle is again about 18 degrees. It is seen that all three of the angles e, ea, and eb are approximately 18 degrees which corresponds with the fact that in FIG. 3 the three angles e, ea, and eb are all shown to be approximately equal at 18 degrees. Similar parallel rays can be drawn for angles passing through the aperture at point 60 other than 0 and these are shown on the transmission curves as at 5, 10, 15, 20, 25, and 30 degrees, respectively.

It should be noted that through the range of the REFLECTION curve of FIG. 4 for distances going from −32 millimeters to +30 millimeters on the filter 34, there is no position where the angles of incidence are the same as any from the TRANSMISSION curve although at about +16 millimeters, the angle of incidence for a point on curve 72 is about 53 degrees and the angle of incidence for a point on curve 82 is about 48 degrees. This is enough of a difference that the filter can be tuned at a point +16 millimeters to reflect rays at 53 degree angles of incidence while transmitting rays of 48 degree angles of incidence. Accordingly there is no overlap and the filter can be properly characterized at all positions thereon.

It is thus seen that I have provided a helmet mounted display which, in addition to being tuned for a specific wavelength of light to be superimposed on a scene being viewed is characterized in such a way that highly improved reflectivity and transmissivity can be accomplished throughout the surface of the filter.

Many changes and alterations will occur to those skilled in the art and I do not wish to be limited to the disclosures used in connection with the preferred embodiment intend only to be limited by the following claims.

The embodiments of the invention in which an exclusive property or right is claimed are defined as follows:

1. In a helmet mounted display which includes an optical system for directing rays of light to one eye of an observer so as to produce an image superimposed upon a remote scene being observed, the improvement comprising:
   a first surface positioned to reflect rays of light received from the optical system at angles of incidence which vary with the positions on the first surface that the rays are received;
   a second surface positioned to receive the rays reflected from the first surface and to reflect them back to the first surface for transmission to the eye of the observer, the first surface being coated with a thin dielectric optical film which is has varying depth over the first surface in accordance with the angle of incidence at the positions so that rays received from the optical system are predominantly reflected and rays received from the second surface are predominantly transmitted.

2. Apparatus according to claim 1 wherein the rays received from the optical system at each position are within a predetermined range of angles of incidence and the rays reflected from the second surface are received at the positions on the first surface at angles of incidence outside of the predetermined range.

3. Apparatus according to claim 2 wherein the varying depth is the depth of the film coating at each position which depth is chosen so as to be predominantly reflective to rays having angles of incidence in the predetermined range and predominantly transmissive to angles of incidence outside of the predetermined range.

4. Apparatus according to claim 1 wherein the observer sees the remote scene through the second surface, the rays of light from the optical system are in a predetermined band of wavelengths and the second surface is coated to be highly reflective to such predetermined band and transmissive to wavelengths outside such predetermined band.

5. Apparatus according to claim 4 wherein the one eye of the observer sees the remote scene through the first and second surfaces so as to receive wavelengths in the predetermined band superimposed on the remote scene.

6. Apparatus according to claim 5 wherein the rays received from the optical system at each position are within a predetermined range of angles of incidence and the rays reflected from the second surface are received at the positions on the first surface at angles of incidence outside of the predetermined range.

7. Apparatus according to claim 6 wherein the varying depth is the depth of the film at each position which depth is chosen so as to be predominantly reflective to rays having angles of incidence in the predetermined range and predominantly transmissive to angles of incidence outside of the predetermined range 8. Apparatus according to claim 7 further including a cathode ray tube operable to produce a desired image in the predetermined band and the rays of light are derived from the image.

9. Apparatus according to claim 8 wherein the second surface is substantially spherical and the image is focussed at infinity.

10. Apparatus according to claim 9 wherein the first surface is substantially planar.

11. Apparatus according to claim 1 further including image means operable to produce a desired image and the rays of light are derived from the image.

12. Apparatus according to claim 11 wherein the image means is a cathode ray tube.

13. The method of increasing the brightness of an image which is superimposed upon a remote scene being viewed by one eye of an operator through first and second surfaces the first surface of which is mounted to receive rays of light from a source of the image at angles of incidence which vary with the position such rays of light are received on the first surface and the second surface of which is mounted to receive rays of light reflected from the first surface and to reflect them back to the first surface for transmission through the first surface to the one eye, comprising the steps of:
  (1) measuring the angles of incidence received at each of a plurality of positions on the first surface may by rays from the source of the image;
  (2) measuring the angles of incidence received at each of the plurality of positions on the first surface made by rays reflected from the second surface;
  (3) adjusting the mounting of the first and second surfaces so that at any of the plurality of positions, the angle of incidence made by rays from the source of the image is different than the angle of incidence made by rays reflected from the second surface; and
  (4) coating the first surface with a plurality of dielectric films of different predetermined thickness at each of the plurality of positions, the thickness being chosen to cause the first surface to be predominantly reflective to rays having the angles of incidence measured in step 1 and predominantly transmissive to rays having angles of incidence measured in step 2.

14. The method of claim 13 wherein the image is of predetermined wavelength and including the step of:
  (5) coating the second surface to be highly reflective to the predetermined wavelength and predominantly transmissive to wavelengths other than the predetermined wavelength.

* * * * *